US010869269B2

(12) United States Patent
Kelley et al.

(10) Patent No.: US 10,869,269 B2
(45) Date of Patent: Dec. 15, 2020

(54) NETWORK SIGNALING OPTIMIZATION FOR LIGHT CONNECTED MODE

(71) Applicant: NOKIA SOLUTIONS AND NETWORKS OY, Espoo (FI)

(72) Inventors: Sean Kelley, Hoffman Estates, IL (US); Devaki Chandramouli, Plano, TX (US); Philippe Godin, Versailles (FR)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 5 days.

(21) Appl. No.: 16/324,223

(22) PCT Filed: Jul. 3, 2017

(86) PCT No.: PCT/EP2017/066470
§ 371 (c)(1),
(2) Date: Feb. 8, 2019

(87) PCT Pub. No.: WO2018/028882
PCT Pub. Date: Feb. 15, 2018

(65) Prior Publication Data
US 2019/0182771 A1 Jun. 13, 2019

Related U.S. Application Data

(63) Continuation of application No. 15/232,378, filed on Aug. 9, 2016, now abandoned.

(51) Int. Cl.
*H04W 52/02* (2009.01)
*H04W 76/27* (2018.01)
(Continued)

(52) U.S. Cl.
CPC ... *H04W 52/0212* (2013.01); *H04W 36/0033* (2013.01); *H04W 36/08* (2013.01);
(Continued)

(58) Field of Classification Search
None
See application file for complete search history.

(56) References Cited

U.S. PATENT DOCUMENTS 9,191,875 B1* 11/2015 Kazeminejad ...... H04W 52/245
2011/0075633 A1* 3/2011 Johansson ............ H04W 36/02
370/331

(Continued)

OTHER PUBLICATIONS

International Search Report and Written Opinion dated Oct. 4, 2017 corresponding to International Patent Application No. PCT/EP2017/066470.

(Continued)

*Primary Examiner* — German Viana Di Prisco
(74) *Attorney, Agent, or Firm* — Squire Patton Boggs (US) LLP

(57) ABSTRACT

Various communication systems can benefit from signaling optimization. For example, communication systems including fourth generation (4G) and fifth generation (5G) networks may benefit from network signaling optimization for light connected mode. A method can include identifying, by a device, that a user equipment has left an area. The method can also include starting, by the device, a suspend procedure for the user equipment based on identifying that the user equipment has left the area.

12 Claims, 8 Drawing Sheets

(51) Int. Cl.
*H04W 36/00* (2009.01)
*H04W 36/08* (2009.01)
*H04W 36/22* (2009.01)
*H04W 36/32* (2009.01)
*H04W 88/06* (2009.01)

(52) U.S. Cl.
CPC .......... *H04W 36/22* (2013.01); *H04W 36/32* (2013.01); *H04W 52/0251* (2013.01); *H04W 76/27* (2018.02); *H04W 36/0072* (2013.01); *H04W 88/06* (2013.01); *Y02D 30/70* (2020.08)

(56) References Cited

U.S. PATENT DOCUMENTS

| | | | |
|---|---|---|---|
| 2013/0203414 A1 | 8/2013 | Zong et al. | |
| 2013/0260811 A1* | 10/2013 | Rayavarapu | H04W 76/19 455/509 |
| 2015/0029999 A1* | 1/2015 | Horn | H04W 36/22 370/331 |
| 2017/0332419 A1* | 11/2017 | Kim | H04L 1/1861 |
| 2017/0332424 A1* | 11/2017 | Salot | H04L 43/16 |
| 2019/0045572 A1* | 2/2019 | Kim | H04W 76/20 |

OTHER PUBLICATIONS

Kyocera, "Details of paging enhancements and Light Connection," 3GPP Draft; R2-164047, 3GPP TSG-RAN WG2 #94, Nanjing, China, May 22, 2016, XP051105374.

Intel Corporation, "Benefits of Light Connection over Suspend-Resume procedure," 3GPP Draft; R2-163631, 3GPP TSG RAN WG2 Meeting #94, Nanjing, China, May 22, 2016, XP051105065.

Nokia et al., "Paging for light connection," 3GPP Draft; R3-161352, 3GPP TSG-RAN WG3 Meeting #92, Nanjing, China, May 22, 2016, XP051106150.

3GPP TR 24.801 V8.1.0 (Dec. 2008), Technical Report, 3rd Generation Partnership Project; Technical Specification Group Core Network and Terminals; 3GPP System Architecture Evolution; CT WG1 Aspects (Release 8), 3GPP, Dec. 18, 2018, XP050910877.

Intel Corporation, "Light connection DRX paging cycle and mechanism," 3GPP Draft; R2-163632, 3GPP TSG RAN WG2 Meeting #94, Nanjing, China, May 22, 2016, XP051105066.

Communication pursuant to Article 94(3) EPC dated Oct. 16, 2020 corresponding to European Patent Application No. 17736635.8.

* cited by examiner

NETWORK SIGNALING OPTIMIZATION FOR LIGHT CONNECTED MODE

BACKGROUND

Field

Various communication systems can benefit from signaling optimization. For example, communication systems including fourth generation (4G) and fifth generation (5G) networks may benefit from network signaling optimization for light connected mode.

Description of the Related Art

In 4G networks, it may be important to optimize the signaling of user equipment (UEs) which can have intermittent data exchanges and slow mobility. Up to release 13 there were only two ways of configuring a UE. If a UE is kept in radio resource control (RRC) connected mode then the UE can exchange data after inactivity without an initial triggering signaling phase, a transition from idle to connected, but then every change of cell causes RRC extra signaling compared to idle mode, for example measurement report+RRC handover signaling.

Conversely, if the UE is kept in idle mode then it can move between cells using cell re-selection but then whenever there is some exchange of data, there is an RRC triggering signaling phase, to transition from idle to active. The signaling above consumes battery or other power. Moreover, an increasing number of devices engage in frequent short data exchange and have slow mobility.

3GPP has envisioned in release 14 of LTE a new third way of RRC: light connected (LC) mode, whereby the UE can move across the cells of an LC area doing only cell re-selection instead of doing the classical signaling of RRC, such as measurement report and handover signaling. In what the following discussion will call the inter-eNB LC mode, this LC area extends across more than one evolved Node B (eNB). At the same time the UE is kept S1 connected to the last serving eNB while in LC mode. This means that when the UE wants to exchange data the following signaling happens depending on two cases.

FIG. 1 illustrates data exchange in two scenarios. In the first case, the UE is still under coverage of the last serving eNB1 (anchor eNB) and RRC signaling needed is almost zero. The signaling needed is RRC page in the eNB1 for mobile terminated (MT) data and the UE response. In FIG. 1, this is shown as a Uu paging from anchor eNB to UE and paging response to the anchor eNB.

In the second case, the UE has moved outside the last serving eNB1 into an eNB2 of the LC area. Then for MT data, for example incoming downlink data, the last serving eNB needs to send multiple paging messages over X2 towards all the eNBs involved in the LC area. Those eNBs send RRC paging messages. The UE just sends an RRC resume or paging response message to eNB2 which triggers a network context fetch procedure involving S1 and X2 signaling. In FIG. 1, the UE paging response is shown as a Uu paging response on other eNB.

The above approach may provide the RRC savings advantages of RRC idle mode when moving inactive across the LC area and, whenever data needs to be exchanged, the RRC signaling sent by the UE is limited to this "Uu paging response" message for MT case, as shown at 4a and 4b in the two respective cases.

However, one can see that the approach entails (S1, X2) signaling for the second case where the UE has moved out of the last serving eNB (anchor eNB), such as X2 paging, and (X2, S1) context fetch signaling.

There are at least eight issues of this approach. According to a first issue, in order to enable the context fetch and not lose data, the LC area must be composed of eNBs which all have an X2 link with the last serving eNB. Thus, the definition of LC area should be per anchor eNB and one needs to configure one LC area per eNB in the network. Moreover, considering that X2 interface can be flexibly added/removed in release 12 onwards (X2 removal feature) it becomes complex to have dynamic update of LC areas by operations and maintenance (O&M), as LC area of an anchor eNB1 will need to be updated as soon as any of the current eNB2s part of the LC area removes the X2 connection with eNB1, and even worse, accounting for the fact that an eNB3 neighbour of the LC area needs to inform the eNB1 when it sees the UE moving out of the LC area, as soon as one neighbor eNB3 of any of the current eNB2s part of the LC area removes the X2 connection with eNB1. Thus, the first issue is that definition, configuration and update of LC areas in the network is complex to achieve.

The first issue means that the size of LC areas will remain limited. Considering a moving UE, this means the anchor eNB relocation signaling could happen frequently. Anchor eNB relocation means changing the "last serving eNB" role above even though no data has been exchanged by the UE. This relocation requires UE to send an RRC message and the equivalent signaling of context fetch over X2 and S1 signaling triggered.

Thus, a second issue is that for moving UEs, the so-called inter-eNB LC mode will generate extra signaling at every anchor eNB relocation involving additional S1, X2 but also RRC messages.

If the UE is no longer under the coverage of the last serving eNB, the anchor eNB will need to page over X2 possibly successively (paging repetitions) across the LC area with the following impacts. According to a third issue, there is a need to define a new X2 paging message. According to a fourth issue there is a need to define a new paging identifier over X2 and therefore new PO calculation (similar to 36.304). According to a fifth issue, there is a need of huge buffering in anchor eNB for all the UEs it serves being paged in LC mode. According to a sixth issue, there is a need of forwarding this huge buffered data over X2 and the last mile, which can be referred to as a tromboning effect (downlink traffic re-injected into the uplink). According to a seventh issue, there can be data loss if the new eNB has no X2 with anchor eNB, and there can be a need to dynamically manage LC areas, as described above. According to an eighth issue, there will be an increase of contexts in the serving gateway (SGW), always-on, stateful SGW instead of stateless SGW because the context is kept in the SGW while the UE is moving across the LC area.

SUMMARY

According to certain embodiments, a method can include identifying, by a device, that a user equipment has left an area. The method can also include starting, by the device, a suspend procedure for the user equipment based on identifying that the user equipment has left the area.

In certain embodiments, a method can include identifying, by a device, that a user equipment has left an area. The method can also include communicating, by the device, with an access node of the LC area to inform the access node that the user equipment has left the area.

A method, according to certain embodiments, can include receiving, at a device, a first area identifier corresponding to a first radio access network area (respectively access node). The method can also include receiving, at the device, a second area identifier corresponding to a second radio access network area (respectively to a second access node) different from the first radio access network area (respectively different from the first access node). The method can further include determining, by the device, that the second identifier is different from the first identifier. The method can additionally include generating, by the device, an indication toward an access node based on the determination.

An apparatus, in certain embodiments, can include at least one processor and at least one memory including computer program code. The at least one memory and the computer program code can be configured to, with the at least one processor, cause the apparatus at least to identify that a user equipment has left an area. The at least one memory and the computer program code can also be configured to, with the at least one processor, cause the apparatus at least to start a suspend procedure for the user equipment based on identifying that the user equipment has left the area.

According to certain embodiments, an apparatus can include at least one processor and at least one memory including computer program code. The at least one memory and the computer program code can be configured to, with the at least one processor, cause the apparatus at least to identify that a user equipment has left an area. The at least one memory and the computer program code can be configured to, with the at least one processor, cause the apparatus at least to communicate with an access node of the LC area to inform the access node that the user equipment has left the area.

In certain embodiments, an apparatus can include at least one processor and at least one memory including computer program code. The at least one memory and the computer program code can be configured to, with the at least one processor, cause the apparatus at least to receive a first area identifier corresponding to a first radio access network area (respectively access node). The at least one memory and the computer program code can also be configured to, with the at least one processor, cause the apparatus at least to receive a second area identifier corresponding to a second radio access network area (respectively to a second access node) different from the first radio access network area (respectively different from the first access node). The at least one memory and the computer program code can further be configured to, with the at least one processor, cause the apparatus at least to determine that the second identifier is different from the first identifier. The at least one memory and the computer program code can additionally be configured to, with the at least one processor, cause the apparatus at least to generate an indication toward an access node based on the determination.

An apparatus, according to certain embodiments, can include means for identifying that a user equipment has left an area. The apparatus can also include means for starting a suspend procedure for the user equipment based on identifying that the user equipment has left the area.

An apparatus, in certain embodiments, can include means for identifying that a user equipment has left an area. The apparatus can also include means for communicating with an access node of the LC area to inform the access node that the user equipment has left the area.

According to certain embodiments, an apparatus can include means for receiving a first identifier corresponding to a first radio access network area (respectively access node). The apparatus can also include means for receiving a second identifier corresponding to a second radio access network area (respectively access node) different from the first radio access network area (respectively access node). The apparatus can further include means for determining that the second identifier is different from the first identifier. The apparatus can additionally include means for generating an indication toward an access node based on the determination.

A computer program product can, in certain embodiments, encode instructions for performing a process. The process can include any of the above-described methods.

A non-transitory computer-readable medium can, according to certain embodiments, be encoded with instructions that, when executed in hardware, perform a process. The process can include any of the above-described methods.

BRIEF DESCRIPTION OF THE DRAWINGS

For proper understanding of the invention, reference should be made to the accompanying drawings, wherein:

FIG. 4 presents two options: a first option where the new eNB takes the decision to suspend and a second option where the anchor eNB takes the decision (and potentially includes a UE_ID for suspended state to relay to the UE).

DETAILED DESCRIPTION

Figure 1:
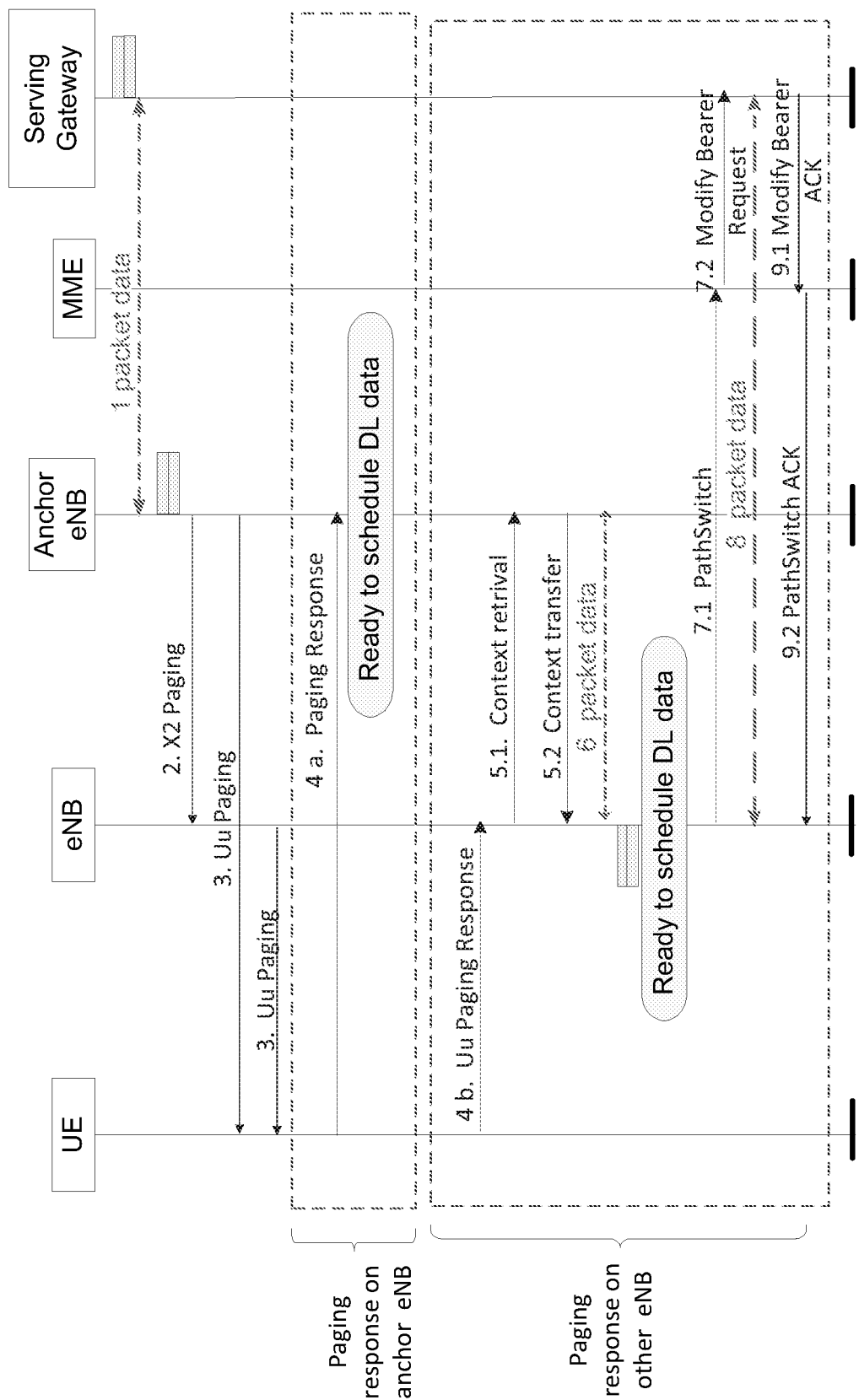
FIG. 1 illustrates data exchange in two scenarios.

Certain embodiments can improve the approach described above. For example, certain embodiments can keep the same RRC signaling savings while avoiding the first through eighth issues mentioned above, depending on deployment. Four examples are provided by way of illustration and not limitation.

According to a first example, every eNB of the network can broadcast an eNB ID identifier over the air in all its cells. The LC mode can be kept for UEs as in the existing approach as long as the UE is under the last serving eNB1. Whenever the UE re-selects a cell of another eNB2, which the UE can see from the broadcast eNB ID, the UE can send a "location report" RRC message to eNB2 which eNB2 propagates to the last serving eNB1 over X2. eNB1 can then trigger a "suspend" procedure similar to the one used in the cellular internet of things (CIoT). eNB1 can send an "S1 suspend request" to a mobility management entity (MME)

which can move the UE to evolved packet system (EPS) connection management (ECM)-idle state but the MME can keep a context of the UE, for example suspended state of CIoT.

Whenever the UE needs to exchange data, for example in MT, the CIoT procedure can be reused. For example, the MME can page the UE and the UE can respond over RRC triggering a context fetch.

This first example may lead to about the same number of signaling messages but may remove almost all of the issues identified above. As to the first issue, because the UE is managed by release 13 optimizations reachability in ECM-idle mode, the first example can avoid the complexity of coordinating dynamic LC areas with neighbor eNBs. As to the second issue, signaling to move to suspended state may happen only once, even if the UE crosses multiple eNBs between two active (i.e. transmission/reception) phases and regardless of whether these eNBs are X2-connected or not. As to the third issue, there is no need to define a new X2 paging message. As to the fourth issue, there is no need to define a new paging identifier over X2 and therefore new PO calculation, similar to 3GPP technical specification (TS) 36.304. As to the fifth issue, there is no need of any increased huge buffering in anchor eNB, since the buffering can happen in the SGW in suspended state. As to the sixth issue, there is no need of forwarding a huge amount of buffered data over X2 and the last mile, as the buffering can happen in the SGW in suspended state. As to the seventh issue, there may be no loss of data even if no X2 exists between the new eNB and the old eNB, because data is buffered in SGW. As to the eighth issue, there is no increase of contexts in the SGW due to always-on stateful in SGW. The SGW can remain stateless as in CIoT suspended state As an alternative, this example can also cover the case where the receiving eNB2 initiates relocation of anchor eNB from last serving eNB1 into receiving eNB2 when receiving the RRC location report message from the UE.

The following examples may allow for flexible deployments mixing certain embodiments with previous approaches.

In a second example, in addition to all eNBs broadcasting their eNB ID, the last serving eNB can send a list of eNB IDs to the UE when an inactivity timer expires. The list can correspond to the LC area for the UE. For example, when the UE exits this LC area, the UE can send an RRC location report. The receiving eNB can then either relocate the anchor eNB or, in an example approach, propagates the location report over X2 to the last serving anchor eNB, which can trigger an S1 suspend request to the MME.

In a third example, the network can be partitioned in areas called radio access network (RAN) areas. Each eNB can be mapped to one RAN area and the eNB can broadcast a corresponding RAN area ID instead of the eNB ID mentioned above. As long as the UE is within the RAN area, the UE may not be required to send a location report. When the UE moves out of the RAN area ID broadcast by the last serving eNB, then the UE can send an RRC location report. The receiving eNB can either relocate the anchor eNB, or, in an example approach, can propagate the location report over X2 to the last serving/anchor eNB which can trigger an S1 suspend request to the MME. When the eNB receives DL data targeted for the UE, it can page the UE in the cells that belong to the RAN area.

This third example can be seen as an extension of the first example, where the first example corresponds to the third example with a RAN area equal to an eNB.

In a fourth example, the network can be partitioned in areas called RAN areas. Each eNB can be mapped to one RAN area and can broadcast a corresponding RAN area ID instead of the eNB ID mentioned above. The last serving eNB can send a list of RAN area IDs to the UE when inactivity timer expires. As long as the UE is within the RAN area corresponding to the list of RAN Area IDs, the UE is not required to send location report. When the UE moves out of the RAN area corresponding to the received list of RAN area IDs then the UE sends the RRC location report; then the receiving eNB either relocates the anchor eNB (like existing solution), or, in an example approach, propagates the location report over X2 to the last serving (anchor) eNB which triggers a S1 suspend Request to the MME (new solution). When the eNB receives DL data targeted for the UE, it pages the UE in the cells that belong to the RAN area.

Certain embodiments also address the situation in which the receiving eNB, described in the four examples above, takes a decision between relocation of anchor eNB or propagation of location report to anchor eNB over X2 in order to trigger S1 suspend based on one or more of the following criteria: support of the X2 paging, speed of the UE, or load of the network.

In other embodiments the four examples described above can apply to 5G system. In such embodiments, the eNB can be replaced by 5G RAN node (currently called GNB) and the X2 interface by the interface between two GNBs.

Figure 2:
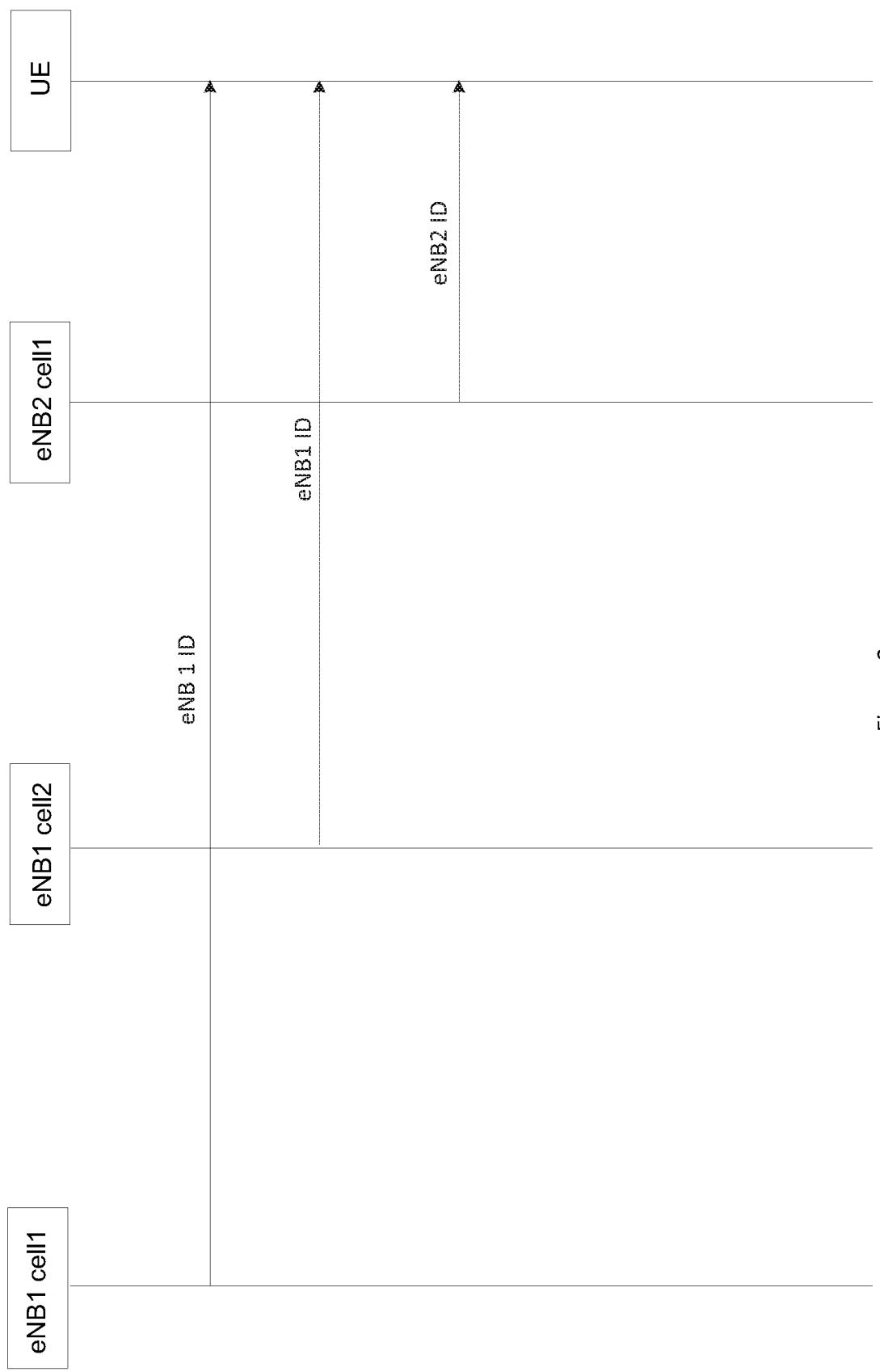
FIG. 2 illustrates the broadcast by eNB of eNB (access node) identity over the air for all cells of the eNB, according to certain embodiments.

FIG. 2 illustrates the broadcast of eNB identity over the air for all cells of the eNB, according to certain embodiments. Thus, FIG. 2 can correspond to the first or second example discussed above. As shown in FIG. 2, each eNB can send its own identification (ID), for example using a broadcast or multicast message. Alternatively, the last serving eNB could communicate to the UE the list of cells it comprises at the end of the last active sequence. The list can be sent, for example, over an RRC message.

Figure 3:
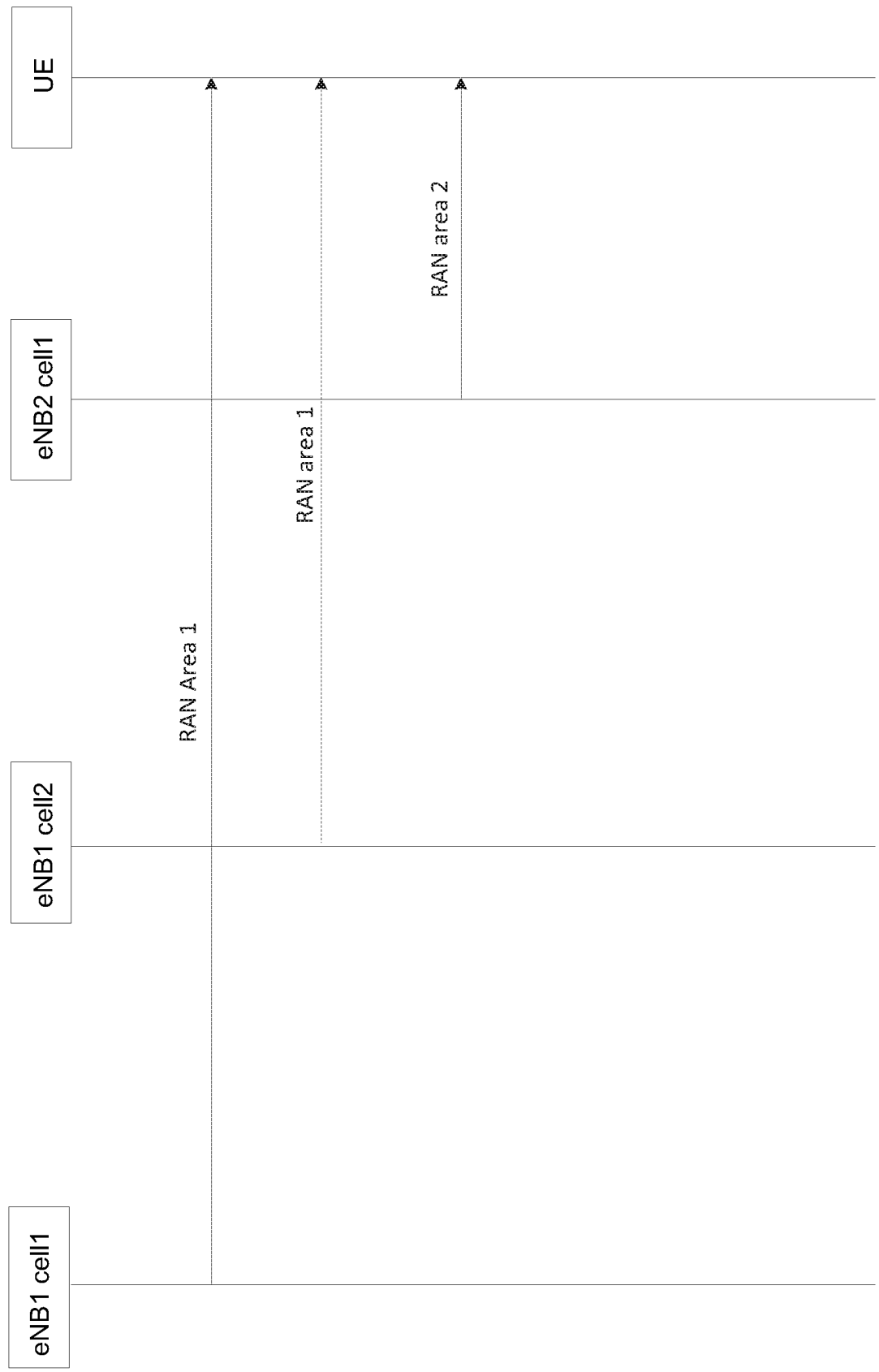
FIG. 3 illustrates the broadcast by eNB cells of a radio access network area identity over the air according to certain embodiments

FIG. 3 illustrates the broadcast of RAN area identity over the air for cells of the eNB, according to certain embodiments. Thus, FIG. 3 can correspond to the third or fourth example discussed above.

Figure 4:
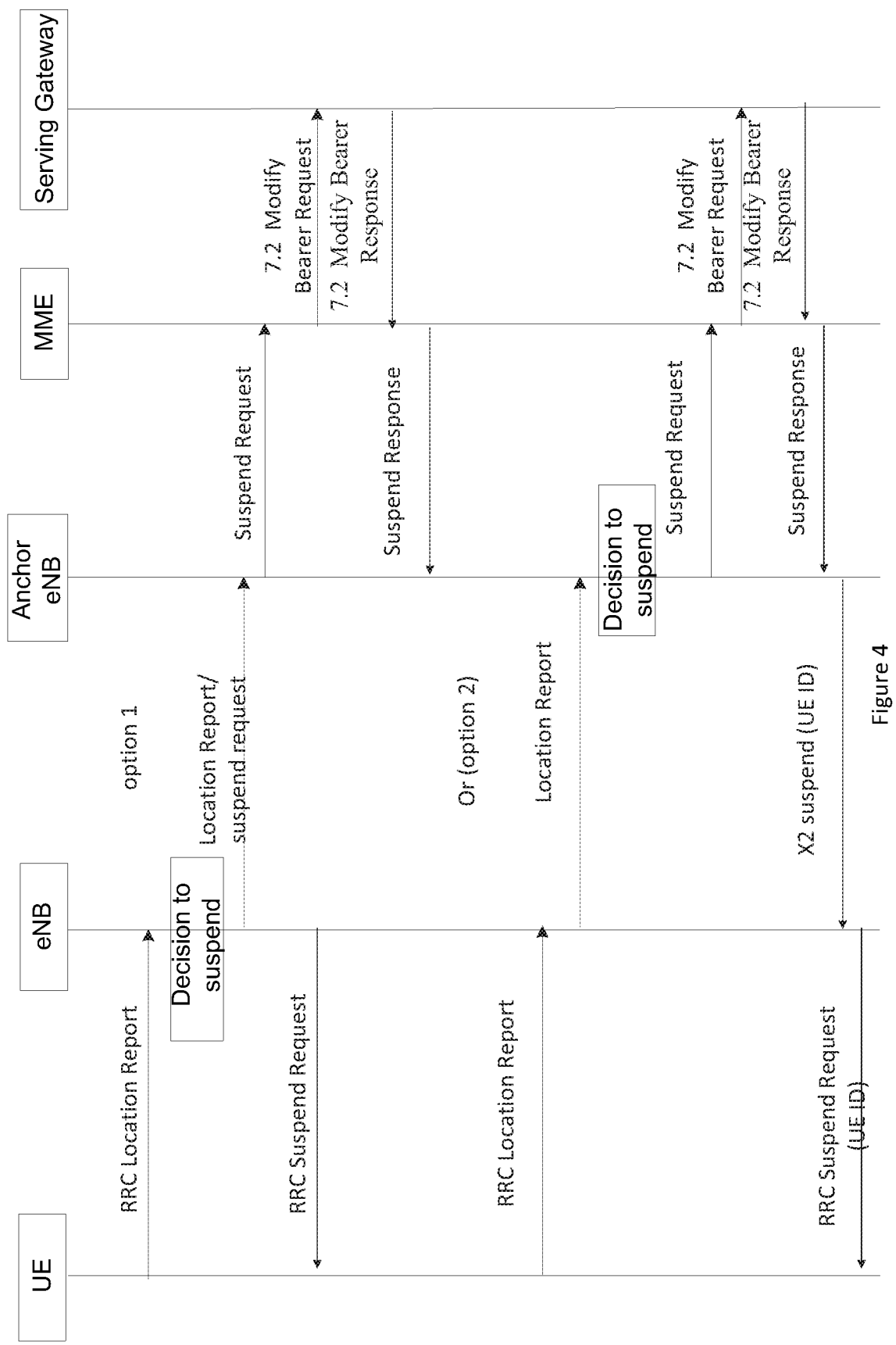
FIG. 4 illustrates signaling involved when a UE moves out of the last serving eNB, according to certain embodiments or out of the LC area according to some other embodiments.

FIG. 4 illustrates signaling involved when a UE moves out of the last serving eNB, according to certain embodiments.

Figure 5:
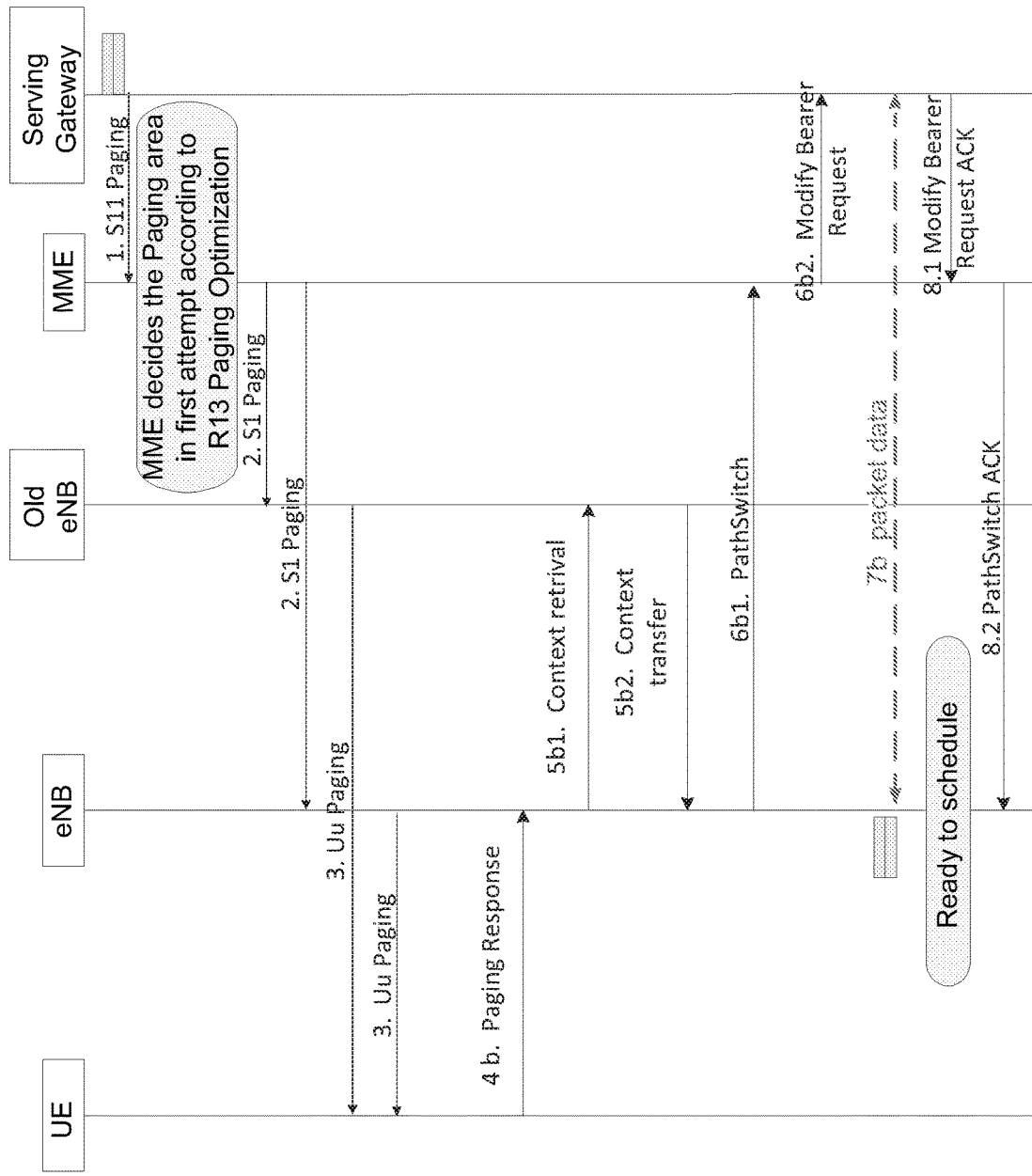
FIG. 5 illustrates signaling involved whenever data needs to be exchanged, according to certain embodiments.

FIG. 5 illustrates signaling involved with an MT call, according to certain embodiments. As shown in FIG. 5, at 1 there can be S11 paging from a serving gateway to an MME. The MME can decide the paging in a first attempt according to R13 paging optimization. At 2, the MME can send S1 paging to the old eNB and a currently serving eNB. Both eNBs can send Uu paging at 3. At 4b, the UE can provide a paging response to the currently serving eNB. The eNB can send a context retrieval request at 5b1 and receive context transfer at 5b2.

At 6b1, the eNB can send a pathswitch request to the MME. Accordingly, at 6b2 the MME can send a modify bearer request to the serving gateway. The serving gateway can begin transferring packet data at 7b to the eNB and can acknowledge the bearer modification request at 8.1. The MME can acknowledge the pathswitch request at 8.2, and the eNB can already be prepared to schedule the data provided from the serving gateway.

Figure 6:
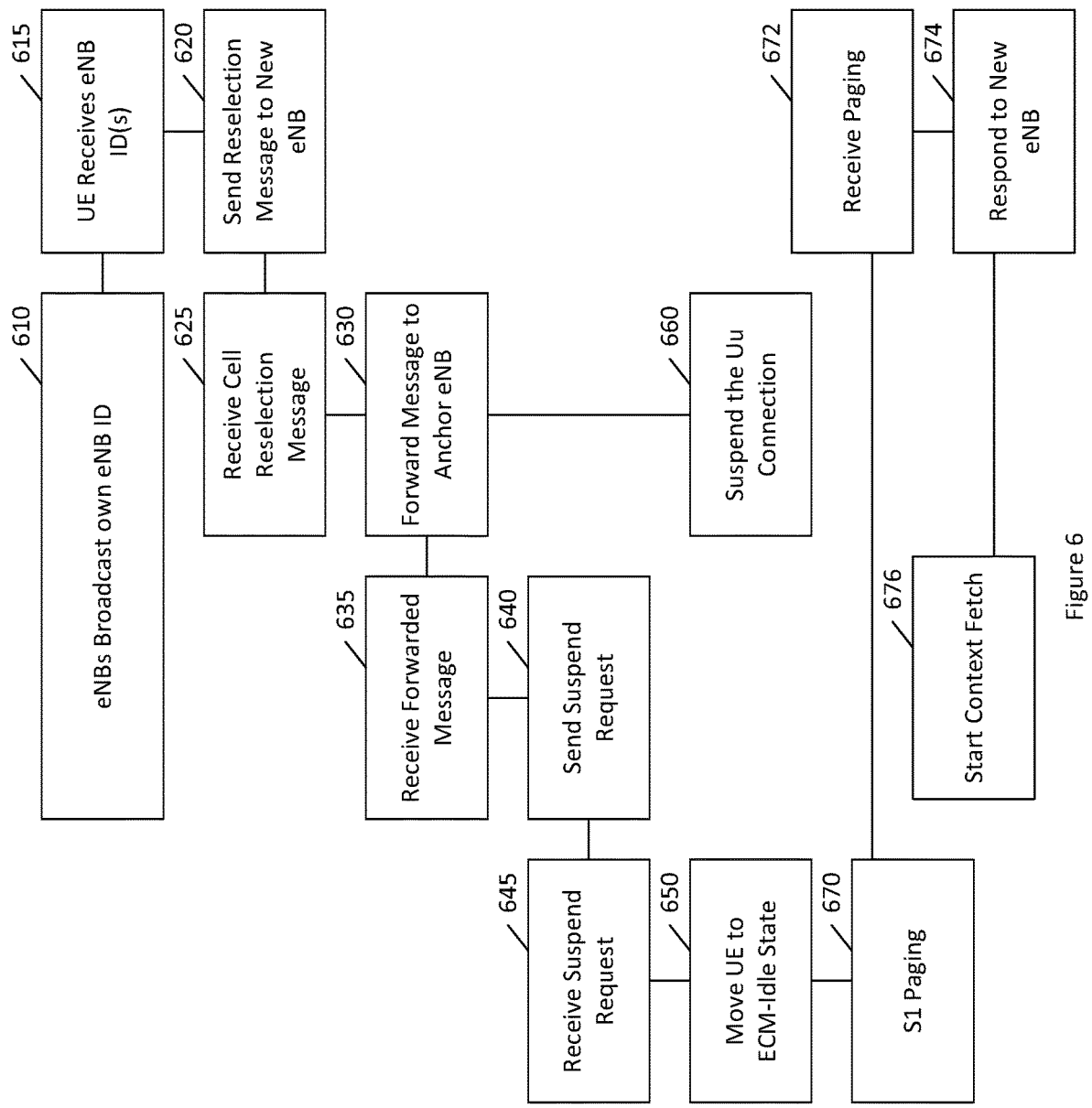
FIG. 6 illustrates a method according to certain embodiments.

FIG. 6 illustrates a method according to certain embodiments. As shown in FIG. 6, at 610, all eNBs or other access nodes can broadcast their own eNB ID to all their cells. This can be done using any desired or known technique for disseminating information within cells or sub-cells under the control of any access node, such as an eNB. At least one of these IDs can be received by a user equipment in or near one of the cells, at 615.

A UE first connected to eNB1 can, at 620, re-select to a cell of new eNB2 and can send a message to the new eNB2. This can be a "location report" RRC message or other message that provides an indication that the UE is undergoing a cell reselection. This message can be received by the new eNB at 625.

The new eNB2 can, at 630, forward this message to anchor eNB1 over X2. This message can be received by the anchor eNB1 at 635. At 640, the anchor eNB1 can send an "S1 suspend request" to MME. This message can be received by the MME at 645. At 650, the MME can move the UE to ECM-idle state but can keep the context of the UE. At 660, the new eNB2 can suspend the Uu connection.

Location information about the UE can be forwarded to anchor eNB1 at 630, which can be a reason why the eNB1 can, at 640, send the S1 suspend request to MME. Based on this message the UE state can be set to idle at 650. For the same reason, the new eNB2 can suspend the Uu connection at 660. In case of MT data, the MME can trigger S1 paging to return to connected mode.

Thus, at 670, when it is detected there is MT data to be exchanged, the MME can page the UE by sending S1 paging, thereby triggering Uu paging. The UE can receive the paging at 672. The UE can, at 674, respond to paging to new eNB2 and the new eNB 2 can, at 676, start a context fetch procedure towards anchor eNB1.

There is an additional option, namely to broadcast an RAN Area ID to all cells of a given RAN area. This can correspond to an area where RAN-based paging is supported, which can be equivalent to the area where the UE may remain in light connected mode.

With this option, the features at 620 through 676 can be executed if the new eNB is out of the original RAN area. A cell reselection message related to a single RAN area may still be sent for other purposes, but it would not trigger the same processes including the suspension described above if the RAN area includes both the original eNB and the new eNB. The example discussed in FIG. 6 can be seen as an example in which the RAN area is simply one eNB.

Figure 7:
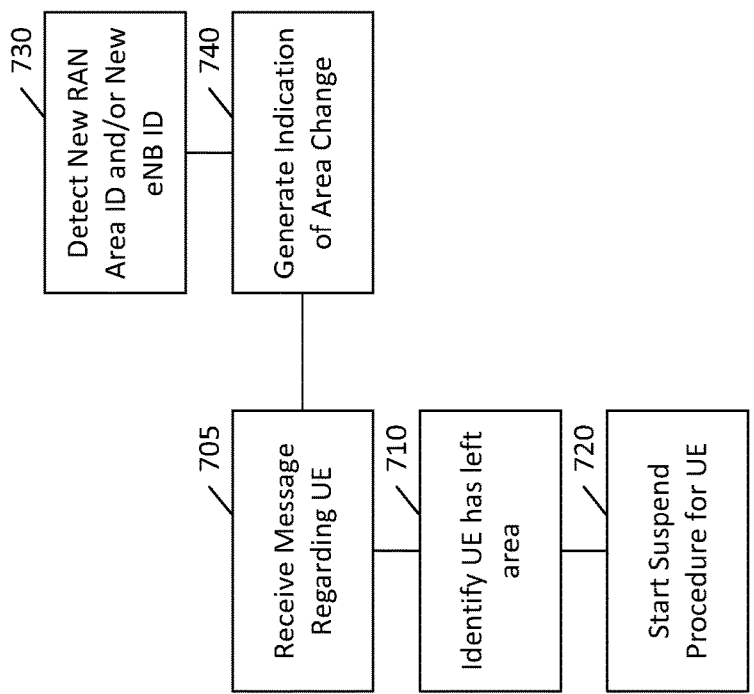
FIG. 7 illustrates a further method according to certain embodiments.

FIG. 7 illustrates a further method according to certain embodiments. As shown in FIG. 7, a method can include, at 710, identifying that a user equipment (UE) has left a given area. The trigger for this identification may be the reception, at 705, of a message from and/or regarding a UE. The message from the UE can be relayed or forwarded over an interface, such as the X2 interface. Alternatively, an access node that receives the message from the UE can generate a different message that conveys the same information regarding the fact that the UE has changed areas. The receiving access node can then send the generated message to another access node (here the anchor eNB).

The given area can be the area of just a single access node, such as an eNB, or the area of multiple access nodes or cells. Thus, the identification that the user equipment has left the area can be made by receiving an indication from a user equipment that identifies a different eNB ID or other access node identifier or a different RAN area ID or other radio access network area identifier. These various identifiers, such as eNB ID, access node identifier, RAN area ID, or radio access network area identifier can be examples of an area identifier. Thus, for example, an area identifier can include at least one of an access node identifier or a radio access network area identifier.

The method can also include, at 720, starting, such as by deciding or triggering, a suspend procedure for the user equipment based on the identification that the UE has left the given area.

The indication provided by the UE and ultimately received in some form or other by the access node at 705 may be autonomously generated by the UE at 740 upon detecting, at 730, that a corresponding broadcast RAN area ID or eNB ID has changed. In a particular example, a RAN area can be an eNB area and the RAN area ID can be the eNB ID, although in other cases a RAN area can include a plurality of eNB areas.

Certain embodiments can involve at least two alternative approaches. According to a first approach the system can employ X2 paging within a limited RAN area and use the detailed approach set forth, by way of example, in FIG. 6, to move fast UEs into suspended state in order to reduce signaling for those UEs. According a second approach, however, X2 paging can be fully avoided, thereby minimizing the listed issues for their network.

Figure 8:
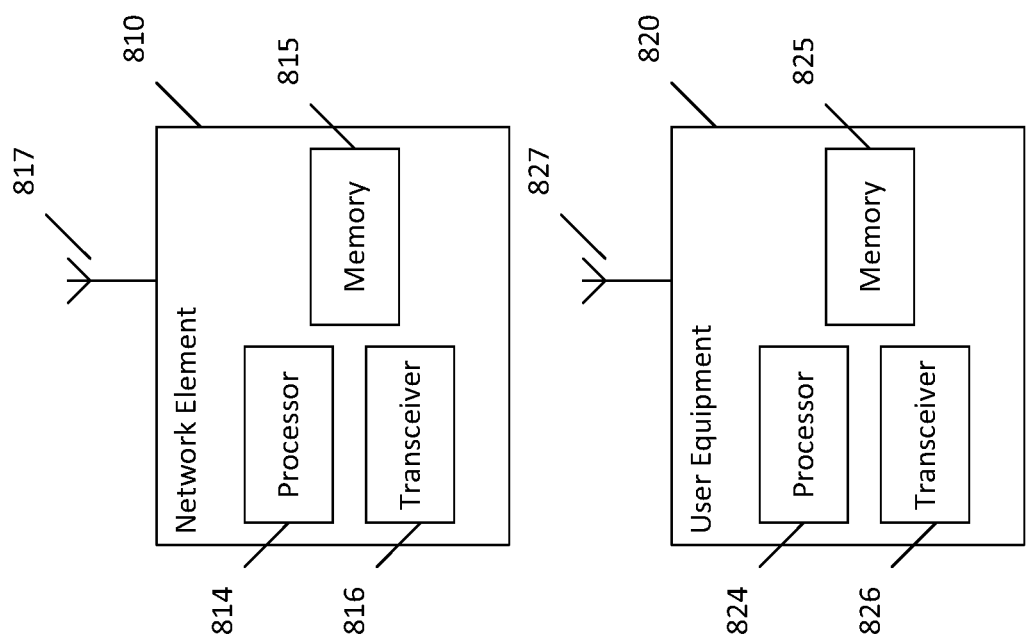
FIG. 8 illustrates a system according to certain embodiments.

FIG. 8 illustrates a system according to certain embodiments of the invention. It should be understood that each block of the flowchart of FIGS. 6 and 7 may be implemented by various means or their combinations, such as hardware, software, firmware, one or more processors and/or circuitry. In one embodiment, a system may include several devices, such as, for example, network element 810 and user equipment (UE) or user device 820. The system may include more than one UE 820 and more than one network element 810, although only one of each is shown for the purposes of illustration. A network element can be an access point, a base station, an eNode B (eNB), a 5G access node, or any other network element, such as a primary cell (PCell) base station or a secondary cell (SCell) base station. Each of these devices may include at least one processor or control unit or module, respectively indicated as 814 and 824. At least one memory may be provided in each device, and indicated as 815 and 825, respectively. The memory may include computer program instructions or computer code contained therein, for example for carrying out the embodiments described above. One or more transceiver 816 and 826 may be provided, and each device may also include an antenna, respectively illustrated as 817 and 827. Although only one antenna each is shown, many antennas and multiple antenna elements may be provided to each of the devices. Other configurations of these devices, for example, may be provided. For example, network element 810 and UE 820 may be additionally configured for wired communication, in addition to wireless communication, and in such a case antennas 817 and 827 may illustrate any form of communication hardware, without being limited to merely an antenna.

Transceivers 816 and 826 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is provided as software that can run on a server.

A user device or user equipment 820 may be a mobile station (MS) such as a mobile phone or smart phone or multimedia device, a computer, such as a tablet, provided with wireless communication capabilities, personal data or digital assistant (PDA) provided with wireless communication capabilities, portable media player, wearable device, digital camera, pocket video camera, navigation unit provided with wireless communication capabilities or any combinations thereof. The user device or user equipment 820 may be a sensor or smart meter, or other device that may usually be configured for a single location.

In an exemplifying embodiment, an apparatus, such as a node or user device, may include means for carrying out embodiments described above in relation to FIGS. 2 through 7.

Processors 814 and 824 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof.

For firmware or software, the implementation may include modules or units of at least one chip set (e.g., procedures, functions, and so on). Memories 815 and 825 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 810 and/or UE 820, to perform any of the processes described above (see, for example, FIGS. 6 and 7). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C #, Java, etc., or a low-level programming language, such as a machine language, or assembler. Alternatively, certain embodiments of the invention may be performed entirely in hardware.

Furthermore, although FIG. 8 illustrates a system including a network element 810 and a UE 820, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node.

Certain embodiments may have various benefits and/or advantages. For example, certain embodiments permit light connected mode and associated RRC savings while minimizing the impacts on network signaling Certain embodiments can provide the RRC savings advantages of RRC idle mode when moving inactive across the last serving eNB and, whenever data needs to be exchanged, the RRC signaling sent by the UE can be limited to this "Uu paging response" message for MT case. By so doing, certain embodiments can provide battery saving for devices which are battery constrained and which may need to exchange intermittent data while moving.

When applied to LTE, certain embodiments can avoid the need to define new X2 paging procedure and principles, can avoid new buffering and data forwarding constraints on the eNB, and can avoid increase of contexts in the SGW. Certain embodiments can leverage eNB and MME implementations that have implemented the CIoT feature.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
    identifying, by an anchor access node, that a user equipment has left an area, wherein identifying that the user equipment has left the area comprises receiving a message which has been sent upon receiving a message transmitted from the user equipment, wherein the received message is received over an X2 interface; and
    starting, by the anchor access node, a suspend procedure for the user equipment based on identifying that the user equipment has left the area,
    wherein starting a suspend procedure comprises
    sending a suspend request to a mobility management entity;
    moving the user equipment to an evolved packet system connection management-idle state; and
    keeping context of the user equipment at the mobility management entity.

2. The method of claim 1, wherein the received message applies to an interface between two access nodes of a mobile network.

3. The method of claim 1, wherein the message transmitted from the user equipment is autonomously generated by the user equipment upon detecting that an area identifier has changed.

4. The method of claim 3, wherein the area identifier comprises at least one of an access node identifier or a radio access network area identifier.

5. The method of claim 1, wherein the area comprises a radio access network area comprising one cell or a plurality of cells in which light connected mode is permitted.

6. A method, comprising:
    identifying, by a new access node, that a user equipment has left an area;
    communicating, by the new access node, with an access node in the area to inform the access node that the user equipment has left the area, wherein the communicating comprises generating a message upon receiving a message from the user equipment, wherein the communicating is performed over an X2 interface; and starting, by the new access node, a suspend procedure for the user equipment based on identifying that the user equipment has left the area, wherein starting a suspend procedure comprises sending a suspend request to a mobility management entity;

moving the user equipment to an evolved packet system connection management-idle state; and keeping context of the user equipment at the mobility management entity.

7. An apparatus, comprising:
at least one processor; and
at least one memory including computer program code,
wherein the at least one memory and the computer program code are configured to, with the at least one processor, cause the apparatus at least to
identify, at an anchor access node, that a user equipment has left an area, wherein identifying that the user equipment has left the area comprises receiving a message which has been sent upon receiving a message transmitted from the user equipment, wherein the received message is received over an X2 interface; and
start a suspend procedure for the user equipment based on identifying that the user equipment has left the area,
wherein starting a suspend procedure comprises
sending a suspend request to a mobility management entity;
moving the user equipment to an evolved packet system connection management-idle state; and
keeping context of the user equipment at the mobility management entity.

8. The apparatus of claim 7, wherein the received message applies to an interface between two access nodes of a mobile network.

9. The apparatus of claim 7, wherein the message transmitted from the user equipment is autonomously generated by the user equipment upon detecting that an area identifier has changed.

10. The apparatus of claim 9, wherein the area identifier comprises at least one of an access node identifier or a radio access network area identifier.

11. The apparatus of claim 7, wherein the area comprises a radio access network area comprising one cell or a plurality of cells in which light connected mode is permitted.

12. An apparatus, comprising:
at least one processor; and
at least one memory including computer program code,
wherein the at least one memory and the computer program code are configured to, with the at least one processor, cause the apparatus at least to
identify that a user equipment has left an area;
communicate with an access node in the area to inform the access node that the user equipment has left the area, wherein the communicating comprises generating a message upon receiving a message from the user equipment, wherein the communicating is performed over an X2 interface; and
start a suspend procedure for the user equipment based on identifying that the user equipment has left the area,
wherein starting a suspend procedure comprises
sending a suspend request to a mobility management entity;
moving the user equipment to an evolved packet system connection management-idle state; and
keeping context of the user equipment at the mobility management entity.

* * * * *